United States Patent [19]

Kissel

[11] Patent Number: 5,230,950

[45] Date of Patent: Jul. 27, 1993

[54] EXTENDED POLYMER COMPOSITIONS AND TEXTILE MATERIALS MANUFACTURED THEREWITH

[75] Inventor: Charles L. Kissel, Anaheim, Calif.

[73] Assignee: Rohm and Haas Company, Philadelphia, Pa.

[21] Appl. No.: 774,036

[22] Filed: Oct. 7, 1991

Related U.S. Application Data

[62] Division of Ser. No. 238,778, Aug. 31, 1988, Pat. No. 5,055,510.

[51] Int. Cl.$^5$ ............................................... B32B 7/00
[52] U.S. Cl. .................................... 428/265; 524/211; 524/216; 524/217; 524/233; 524/555; 524/558; 524/560; 524/562
[58] Field of Search ............... 524/211, 216, 217, 233; 428/265

[56] References Cited

U.S. PATENT DOCUMENTS

| | | | |
|---|---|---|---|
| 3,455,861 | 7/1969 | Bresciani et al. | 524/818 |
| 3,554,987 | 1/1971 | Smith | 260/79.3 |
| 3,658,878 | 4/1972 | Smith | 260/465.4 |
| 4,210,565 | 7/1980 | Emmons | 526/321 |
| 4,656,124 | 4/1987 | Komamura | 430/203 |

Primary Examiner—John C. Bleutge
Assistant Examiner—Mark Sweet
Attorney, Agent, or Firm—James G. Vouros

[57] ABSTRACT

Extended polymer compositions are provided which comprise polymers containing pendant functional groups of the formula:

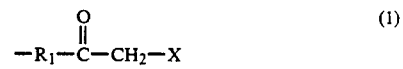

extended, i.e. admixed with a chalcogenide having the empirical formula

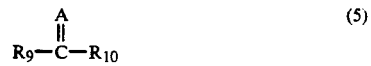

wherein $R_1$ is a divalent organic radical at least 3 atoms in length, X is organoacyl or cyano, A is a chalcogen, each of $R_9$ and $R_{10}$ is independently selected from hydrogen, $NR_{11}R_{12}$, $NR_{13}$ and monovalent organic radicals, at least one of $R_9$ and $R_{10}$ being $NR_{11}R_{12}$ or $NR_{13}$, each of $R_{11}$ and $R_{12}$ is independently selected from hydrogen and monovalent organic radicals, and $R_{13}$ is a divalent organic radical. These compositions can be extended with significant proportions of the described chalcogenides with corresponding reductions in polymer concentration without significant loss of physical properties. The resulting combinations are particularly useful as binders and coatings.

23 Claims, No Drawings

EXTENDED POLYMER COMPOSITIONS AND TEXTILE MATERIALS MANUFACTURED THEREWITH

This application is a division of application Ser. No. 07/238,778, filed Aug. 31, 199 now U.S. Pat. No. 5,055,510.

BACKGROUND OF THE INVENTION

Field of the Invention

This invention relates to the field of polymer compositions and, in particular, it relates to adhesive and coating compositions, adhesive-bonded fibrous articles, e.g. textile and non-woven materials, and to methods for manufacturing such materials.

Introduction

The field of textile and non-woven materials involves all manufactured forms of fiber assemblies including wovens, nonwovens, knitted articles, threads, yarns, ropes, bonded fibrous articles, such as mats, pads, diaper liners, all varieties of paper, tiles (e.g., acoustic tiles), etc. which are employed, in one form or another, in almost every aspect of commercial and household use, either alone or as components of composite articles. (For ease of reference, the term "textile," as used herein, includes bonded, non-woven, fiberous articles, such as papers, and fiberous mats, tiles and the like, as well as bonded woven and non-woven fabrics.) All of these utilities place one or more similar demands on textile materials. Almost without exception, the textile material must have adequate tensile strength for its intended purpose, and such strength is often required under both wet and dry conditions. The most common "wet" conditions to which textiles are exposed occur during manufacture, use, and cleaning and involve exposure to water, soap solutions, and/or dry cleaning solvents such as perchloroethylene. Textile materials exposed to flexing or tensile forces during manufacture, use, or cleaning require adequate flexibility, elongation (ability to stretch without breaking), and shape retention (ability to return to original dimensions after distortion). Since many textiles are exposed to wear during manufacture and use, they should possess adequate abrasion resistance, while those exposed to cleaning operations should have adequate scrub, solvent, and detergent resistance. Many textiles, such as clothing articles, drapes, and various household and commercial textiles, desirably have suitable "hand" (feel) for esthetic or utilitarian purposes. Many textiles also must be sufficiently stable, both chemically and physically, to heat, light, detergents, solvents, and other conditions of exposure to prevent variations in physical characteristics and/or discoloration, e.g. yellowing. Color stability, i.e., the retention of a textile's original color after exposure to heat, light, detergents, etc., is also desirable in many textile materials, particularly in those requiring esthetic appeal.

While all of these properties are, to a large extent, dependent upon the chemical composition of the fibers employed and their mechanical arrangement in the textile material, such properties can be, and often are, dependent upon the composition of chemicals, particularly polymeric binders, employed in their manufacture. Polymeric binders are widely employed to improve one or more physical properties of essentially all forms of textile materials. For instance, binders are used to improve shape retention, abrasion resistance, scrub resistance, and physical and chemical stability of woven and nonwoven textiles, knits, yarns, etc. The use of such binders to provide tensile strength as well as other desirable physical properties is a practical necessity in the manufacture of nonwoven textiles (also known as "formed" fabrics) which are usually characterized as webs or mats of random or oriented fibers bonded together with a cementing medium, such as starch, glue, or synthetic polymers. Synthetic polymers have largely displaced other bonding agents in the manufacture of nonwovens and other textile materials due primarily to improved physical properties they impart to the finished textile.

Synthetic polymers are typically applied to textile materials as solutions or as dispersions of the polymer in an aqueous medium. Such solutions and dispersions must, of course, possess properties which facilitate their use in textile manufacture. For instance, the solution or dispersion, as well as the polymer, must adequately wet the textile fibers to provide adequate distribution, coverage, and cohesiveness. Cohesiveness relates primarily to the ability of the polymer matrix to adhere to the textile fibers, particularly during manufacture and before curing has occurred. Rapid cure rate (the time required for the applied polymer to develop adequate strength in the textile material) is also important in manufacturing due to the demands of high speed manufacturing facilities. While curing catalysts, such as oxalic acid, are employed to cure some polymers, such as polymers which contain N-methylolamides, and they improve cure rate and physical properties, it is preferable, of course, to avoid the need for such catalysts. The necessity of catalyzing polymer curing increases cost and the technical complexity of textile manufacture and can result in the presence of undesirable toxic residues in the finished article.

The use of solvents other than water, while still widely practiced, is becoming more and more undesirable due to solvent expense and the costs and hazards involved in controlling solvent vapors. Yet solvents are still considered necessary to allow bonding of textile materials with polymers which cannot be employed in water-base systems. Thus, water-base polymer latexes are much preferred in the textile manufacturing industry, provided that the necessary physical and chemical properties can be achieved. However, substantial loss of one or more physical properties often results upon substitution of water-base latexes for solvent-base polymers. Latexes of polymers containing N-methylolamide functional groups are known to improve physical properties in essentially all respects. However, such polymers release formaldehyde when cured, and they can result in formaldehyde residues in the finished product. Formaldehyde is coming under ever-increasing scrutiny in both the workplace and home; it is particularly undesirable in medical applications, feminine hygiene products, diapers, and similar articles. To illustrate, Japanese Law No. 112 of 1973 sets a maximum of 75 micrograms of formaldehyde per gram for all textiles used for any purpose and zero (non-detectable) for infant wear products. Similar laws have been proposed in the United States, and the state and federal Occupational Health and Safety Administrations (OSHA) have set stringent formaldehyde exposure limits for industrial workers. California Proposition 65 specifically identifies formaldehyde as a carcinogen and requires that labels for all products containing any amount of formaldehyde, i.e. even on the parts per million level, contain a caution statement that the article is carcinogenic. Thus, paper towels, diapers, and any other articles containing even miniscule amounts of formaldehyde must be labeled as carcinogenic. The necessity for assuring that formaldehyde is not present in manufactured articles is apparent.

Several rheological properties of water-base latexes are particularly important with regard to their utility in the manufacture of textile materials. For instance, control of latex particle size and particle size distribution is critical to the realization of desirable physical properties in many polymer latexes. Another factor, latex viscosity, can limit latex utility in textile manufacturing apparatus due to its influence on polymer distribution, filler loading, and fiber wetting.

Thus, it can be seen that the physical and chemical properties required in textile materials, and in the polymer solutions and dispersions employed to manufacture such materials, place various, sometimes conflicting, demands on the polymer system employed. Obviously, it is desirable to obtain a polymer system, preferably a water-base system, which possesses a wide range of properties desirable in the manufacture of textile materials.

Since cost of materials is always a factor in the production of manufactured articles, it is also desirable to provide polymer systems and manufactured articles, such as textiles, that are as inexpensive as possible, but which still possess the necessary physical and chemical properties. Obviously, cost can be reduced by employing less polymer in the manufacture of articles, such as textiles, although this, almost invariably, results in a loss of one or more desirable properties. While it is sometimes possible to extend polymer solutions, latexes or melts with relatively inexpensive materials, that practice almost invariably reduces one or more essential properties of the polymer system and of articles bonded with such polymers. The above-noted advantages of employing extended polymer compositions apply equally well to coating and adhesive compositions, and it is desirable to extend all types of coating and adhesive compositions with materials less expensive than the polymer itself with as little loss of desirable properties as is possible.

SUMMARY OF THE INVENTION

It has now been found that extended polymer compositions, particularly useful as coatings and adhesives, which exhibit little or no loss of desirable physical properties can be obtained with polymers containing pendant functional groups of the formula:

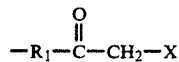  (1)

extended, i.e. admixed with a chalcogenide having the empirical formula

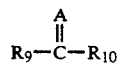  (5)

wherein A is a chalcogen, each of $R_9$ and $R_{10}$ is independently selected from hydrogen, $NR_{11}R_{12}$ or $NR_{13}$, at least one of $R_9$ and $R_{10}$ being other than hydrogen, each of $R_{11}$ and $R_{12}$ is independently selected from hydrogen and monovalent organic radicals, and $R_{13}$ is a divalent organic radical. $R_1$ in formula (1) is a divalent organic radical at least 3 atoms in length, and X is organoacyl or cyano.

These extended polymer compositions can be employed for all varieties of coatings and adhesives, including clear coating, paints, laminating and joining adhesives or as primer coatings over which additional coatings or materials are applied. They are particularly useful for binding textiles. Thus, they can be applied to fiber assemblies either as solutions or aqueous dispersions, although aqueous dispersions are particularly preferred since they eliminate the costs and hazards associated with the use of polymer solvents. Such compositions can be employed to improve the physical properties of essentially all forms of textile materials including wovens, nonwovens, knits, threads, yarns, and ropes, and are particularly useful for the manufacture of nonwoven, knitted, and loose-weave materials. The polymers improve physical properties, including wet and dry tensile strength, of textile materials even in the absence of monomers, such as the N-methylolamides, which release formaldehyde upon curing. Nevertheless, the useful polymers may contain minor amounts of such monomers. In addition to improving wet and dry tensile strength, these compositions result in textile materials of improved abrasion resistance, color stability, scrub resistance, and physical stability (retention of physical strength) upon exposure to heat, light, detergent, and solvents. They have less tendency to yellow with age than do polymers containing other monomers, such as N-methylolacrylamide, often employed to increase tensile strength. The polymers exhibit increased cohesion to fibers containing polar function groups prior to, during, and after cure, and the finished textile materials have increased flexibility, elongation before break, and shape retention at comparable polymer loadings. Yet these improvements are not achieved at a sacrifice of other desirable properties such as flexibility and "hand" which often results from the use of polymer compositions and/or concentrations capable of significantly increasing strength and abrasion resistance. Thus, the finished textiles impart not only improved properties in one or more respects, they exhibit an improved balance of desirable properties as well.

The same is true of the polymer solutions and latexes employed in the textile manufacturing methods of this invention. Thus, latex viscosity, an important consideration in the manufacture of textile materials, is lower than that of otherwise identical latexes of polymers which do not contain the described functional monomers, and it is much less than that of otherwise identical N-methylolacrylamide (NMOA)-containing polymers. Furthermore, latex viscosity is influenced less by latex particle size or particle size distribution. Also, latex particle size and distribution have less, if any, effect on finished textile properties under otherwise identical conditions. Hence, latexes of various particle size and particle size distribution can be used in the same manufacturing process for producing the same textile articles less variation in latex performance or product properties, and it is not as necessary to control particle size or distribution from batch to batch. Since the latexes and solutions have lower viscosities (at similar solids contents), they can be employed for the manufacture of textile articles at higher filler and/or polymer concentrations without exceeding acceptable viscosity limits. Since curing catalysts and cross-linking agents, such as oxalic acid, multivalent complexing metals or metal compounds, glycols, etc., are not required to achieve adequate bonding, such materials can be eliminated from these compositions with commensurate reductions in expense and handling difficulties. Improved fiber wetting, particularly by the useful water-based polymer dispersions, and increased cure rate further facilitate both the ease and speed of textile manufacture. The variety of beneficial properties exhibited by both the methods and textile articles of this invention makes possible the manufacture of a multiplicity of textile materials with little or no reformulation of the useful polymer solutions or dispersions and thereby reduces the inventory of polymer materials required for the manufacture of such various products.

The physical properties of the finished textile are influenced by latex pH to a much lesser extent than is the case with other polymer latexes, such as N-methylolamide-containing polymer latexes. Latexes of N-methylolacrylamide-containing polymers produce maximum textile tensile strengths when applied to textile substrates at a pH of about 2, and finished article tensile strength decreases as pH is increased. This behavior of NMOA-containing polymers greatly limits the pH range within which they can be applied to textile fibers and results in the exposure of manufacturing and handling equipment to acidic corrosive latexes. In contrast, the finished tensile strengths obtained with the latexes useful in this invention changes much less with pH, generally increases as pH is increased from about 2 to about 7, and is typically maximum at a pH within the range of about 4 to about 8. Furthermore, the variation in final product tensile strength over the full pH range, i.e., from around 0.5 to 12, is much less significant than that observed with NMOA-containing polymers. Thus, the methods of this invention can be practiced over a much broader pH range without significant sacrifice of product tensile strength. For the same reason, these methods can be employed to treat acid-sensitive materials and can contain acid-sensitive components which might otherwise be degraded by exposure to acidic latexes.

The presence of the described chalcogenides provides yet further advantages, in that the chalcogenides reduce the amount of relatively expensive polymer that must be present in the composition, yet do not significantly impair, and sometimes even improve, the desired physical properties of the polymer composition. Thus, the desirable processing, coating and binding properties of the compositions can be achieved with much lower polymer concentrations than would be necessary in the absence of the described chalcogenides. In addition, polymer compositions extended with the described chalcogenides also exhibit superior coating and binding properties when employed to bind materials other than textiles. Thus, these compositions can be employed to bind two or more surfaces together and to produce laminates of or coatings on a variety of substrates, such as plastics, wood and other cellulosic materials such as cardboard, paper and the like.

DETAILED DESCRIPTION

Extended polymer compositions exhibiting little or no significant loss of desirable physical properties due to the presence of the extender, particularly useful as coatings and adhesives, are provided which comprise the polymer hereinafter defined extended with one or more of the hereinafter-described chalcogenides. In one embodiment, textile materials having improved physical properties are provided, which materials comprise fiber assemblies containing a polymer having polymerized, olefinically unsaturated carboxylic acid ester groups and pendant functional groups of the formula:

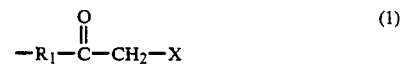 (1)

wherein $R_1$ is a divalent organic radical at least length, and X is organoacyl or cyano. Thus, X is $-CO-R_4$ or $-CN$, preferably $-CO-R_4$, where $R_4$ is hydrogen or a monovalent organic radical preferably having up to about 10 atoms other than hydrogen (i.e., up to 10 atoms not counting hydrogen atoms which may be present in the radical).

Functional groups containing different $R_1$ and X radicals can be contained in the same polymer molecule, or polymers containing different $R_1$ and X groups can be blended in the same solution or dispersion. It is essential only that the useful polymers contain functional groups containing either two carbonyl groups or a carbonyl and a cyano group separated by a single methylene group, as illustrated, and the methylene group is separated from the polymer main chain (backbone) by at least 4 atoms ($R_1$ plus the "interior" carbonyl group). Thus, $R_1$ is at least 3 atoms in length; i.e., the shortest link between the interior carbonyl group and the polymer backbone is at least 3 atoms long. Otherwise, the molecular weight, structure and elementary composition of $R_1$ does not negate the effectiveness of the dual keto or keto-cyano functionality of the pendant side chains. Thus, $R_1$ can be of any molecular weight sufficient to allow incorporation of the pendant functional groups into the polymer backbone, for instance, as part of a polymerizable olefinically unsaturated monomer or by substitution onto a preferred polymer by any suitable addition reaction, e.g.:

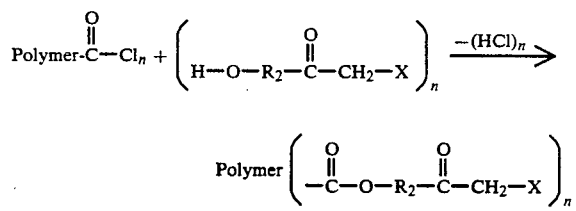

where n is an integer, and $-O-R$ is $R_1$ in expression (1), supra. $R_1$ can contain heteroatoms, such as oxygen, sulfur, phosphorus, and nitrogen, functional groups such as carbonyls, carboxy-esters, thio, and amino substituents, and can comprise aromatic, olefinic or alkynyl unsaturation. Typically, $R_1$ will be a cyclic or acyclic divalent organic radical of 3 to about 40 atoms in length; i.e., having 3 to about 40 atoms in its shortest chain between the polymer backbone and the interior carbonyl group. For ease of manufacture from readily available reactants, $R_1$ is preferably of the formula:

 (5)

wherein Y and Z are independently selected from O, S, and $NR_7$, and $R_3$ is a divalent organic radical at least 1 atom in length, preferably 2 to about 40 and most preferably 2 to about 20 atoms in length. Y and Z are preferably O, and $R_7$ is H or a monovalent organic radical, preferably H or hydrocarbyl radical having up to 6 carbon atoms, with $R_7$ most preferably being H.

Most preferably, $R_3$ is selected from substituted or unsubstituted alkylene, polyoxyalkylene, polythioalkylene and polyaminoalkylene up to about 40 atoms in length, preferably up to about 20 atoms in length. The substituted and unsubstituted polythio-, polyoxy-, and polyamonioalkylenes can be readily formed by the well known condensation of alkylene oxides, alkylene amines, glycols, diamines, and dithiols. Thus:

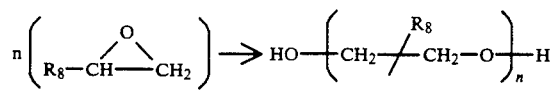

where $R_8$ is H or a monovalent organic radical, preferably H or alkyl radical. To illustrate, such pendant functional groups (formula 1) can be introduced into the polymer backbone by copolymerization of other monomers (discussed hereinafter) with a polymerizable monomer of the formula:

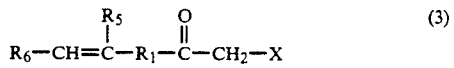

wherein X is as defined for formula 1, supra, $R_6$ and $R_5$ are independently selected from hydroxy, halo, thio, amino, and monovalent organic radicals, preferably having up to 10 atoms other than hydrogen, most preferably alkyl radicals having up to 10 carbons atoms. Substituting the preferred form of the group $R_1$ illustrated in formula 2 for $R_1$ in formula 1 yields the most preferred functional monomers:

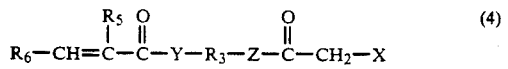

where $R_3$, $R_5$, $R_6$, X, Y and Z have the definitions given above. From this expression it can be seen that when $R_6$ is hydrogen, X is $-CO-R_4$, $R_4$ and $R_5$ are methyl, Y and Z are O, and $R_3$ is an ethylene radical, the resulting monomer is acetoacetoxyethylmethacrylate, one of the class of monomers described by Smith in U.S. Pat. No. 3,554,987, the disclosure of which is incorporated herein by reference in its entirety. This monomer can be prepared by first treating ethylene glycol with methacrylic acid to form hydroxyethylmethacrylate which is then treated with diketene, as described by Smith, to form acetoacetoxyethylmethacrylate. A particularly preferred class of functional monomers, due to their relative availability, are those disclosed by Smith, which correspond to formula (4) in which $R_6$ is hydrogen, Y and Z are oxygen, R is hydrogen or an alkyl group having up to 12 carbon atoms, R is an alkylene group containing up to 10 carbon atoms, X is $-CO-R_4$ and $R_4$ is an alkyl group having up to 8 carbon atoms.

Regarding the following, above-described radicals, typically $R_1$ and $R_3$ each contain no more than 40 carbon atoms, and $R_4$, $R_5$, $R_6$ and $R_7$ each contain no more than 20 carbon atoms. More typically, $R_1$ and $R_3$ each contain no more than 20 carbon atoms, $R_4$, $R_5$, and $R_6$ each contain no more than 10 carbon atoms, and $R_7$ contains no more than 6 carbon atoms.

As used herein, the term "organic radical" refers to any group containing at least one carbon atom. Included therefore are aliphatic and aromatic radicals, whether containing only hydrogen and carbon (i.e., hydrocarbon radicals) or further containing heteroatoms such as oxygen, phosphorus, sulfur, and nitrogen and/or an inorganic substituent such as chlorine, bromine, iodine, etc. Accordingly, such radials include, for example, substituted and unsubstituted alkyl, aryl, arylalkyl, alkylaryl, alkyloxy, aryloxy, arylalkyloxy, alkenyl, alkenyloxy, alkynl, alkynyloxy, and arylalkenyl radicals and heteroatom-containing hydrocarbyl radicals wherein the heteroatoms are preferably selected from oxygen, phosphorus, sulfur, and nitrogen atoms.

Any polymer containing at least one pendant functional group of formula (1), supra, can be employed as the polymer in this invention. The remainder of the polymer, i.e., the portion of the polymer other than the pendant functional groups of formula (1), may be any polymerized olefinically unsaturated monomer or mixture of such monomers, it being essential only that the polymer contain the above-defined functional monomers. Illustrative of other polymerized monomers which can make up the remainder of the polymer are, for example, (A) conjugated diolefin polymers comprising, e.g. about 50 weight percent of one or more conjugated diene monomers having 5 to about 8 carbon atoms and 0 to about 50 weight percent of one or more alkenyl-substituted monoaromatic monomers, (B) olefin-ester interpolymers comprising, e.g. about 1 weight percent or more of a monoolefin monomer having up to about 4 carbon atoms and about 40 weight percent or more of an alkenyl or alkenol ester of a saturated carboxylic acid, (C) olefinically unsaturated carboxylic acid ester polymers comprising, e.g. about 40 weight percent or more polymerized olefinically unsaturated carboxylic acid ester monomers, (D) alkenyl ether polymers containing, e.g. about 30 weight percent or more alkenyl ether monomer units, (E) polymers of vinylidene chloride or vinyl chloride with or without other comonomers such as olefinically unsaturated carboxylic acid ester monomers and/or olefinically unsaturated carboxylic acid monomers and (F) combinations thereof. The polymers of group (C) are presently preferred, i.e., the remainder of the polymer containing at least one pendant functional group of formula (1) preferably comprises at least about 40 weight percent of at least one polymerized olefinically unsaturated carboxylic acid ester monomer.

The polymers contain a sufficient amount of one or more of the described functional monomers to improve one or more physical properties of the coating or adhesive composition relative to a similar coating or adhesive composition containing a similar polymer absent such functional monomers. Generally, these polymers will contain at least about 0.5, often at least about 1 weight percent of the functional monomer based on total monomer content. Increasing the concentration of the described functional monomers to a level substantially above 20 weight percent generally does not produce significantly greater technical effects. Thus, functional monomer concentrations will usually be between about 0.5 to about 20 weight percent, typically about 0.5 to about 10 weight percent. Significant improvements in the physical properties described above usually can be achieved at functional monomer concentrations of about 0.5 to about 10 weight percent.

The useful functional monomers produce significant improvements in coating and bonding properties when employed with polymers which contain significant amounts of polymerized, olefinically unsaturated mono- and/or polycarboxylic acid esters. Thus, the polymers will usually contain at least about 10 weight percent, often at least about 20 weight percent, and preferably at least about 30 weight percent of olefinically unsaturated, carboxylic acid ester monomers other than the above-described functional monomers. The most preferred polymers contain at least about 50 weight percent, generally at least about 80 weight percent, of such ester monomers. Presently preferred ester monomers are esters of olefinically unsaturated mono- or dicarboxylic acids having up to 10 carbon atoms, and hydroxy-, amino-, or thio-substituted or unsubstituted alcohols, amines, and thiols having from 1 to about 30 carbon atoms, preferably 1 to about 20 carbon atoms, per molecule. Illustrative unsaturated carboxylic acids are acrylic, methacrylic, fumaric, maleic, itaconic, etc. Illustrative hydroxy-, amino-, and thio-substituted alcohols, amines, and thiols are glycerol, 1-hydroxy-5-thiododecane, 2-amino-5-hydroxyhexane, etc. Presently preferred esters, due primarily to cost and availability, are acrylic and methacrylic acid esters of hydroxy-substituted and unsubstituted alcohols, in which the alcohol moiety has up to about 10 carbon atoms, such as butyl acrylate, 2-ethylhexyl acrylate, methyl methacrylate, 2-hydroxyethyl acrylate, etc.

The described functional monomers and ester monomers can constitute the total polymer composition, or the portion of the polymer molecule not accounted for by those two monomer classes can be any polymerizable, olefinically unsaturated monomer or combination of monomers. Illustrative of such other polymerizable monomers are vinyl esters of carboxylic acids, the acid moiety of which contains from 1 to about 20 carbon atoms (e.g., vinyl acetate, vinyl propionate, vinyl isononoate); aromatic or aliphatic, alpha-betaunsaturated hydrocarbons such as ethylene, propylene, styrene, and vinyl toluene; vinyl halides such as vinyl chloride and vinylidene chloride; olefinically unsaturated nitriles such as acrylonitrile; and olefinically unsaturated carboxylic acids having up to 10 carbon atoms such as acrylic, methacrylic, crotonic, itaconic, and fumaric acids, and the like. It has been found that minor amounts of olefinically unsaturated carboxylic acids, acid amides, acid nitriles and/or sulfoalkyl esters of such carboxylic acids significantly improve tensile strength and/or other physical properties of the finished textile material. Thus, it is presently preferred that the polymer contain at least about 0.1 weight percent, usually about 0.1 to about 10 weight percent, and preferably about 0.1 to about 5 weight percent of a polymerizable, olefinically unsaturated carboxylic acid, acid amide and/or acid nitrile having up to about 10 carbon atoms and/or a sulfoalkyl ester of such acids, such as acrylic acid, itaconic acid, acrylamide, methacrylamide, acrylonitrile, sulfoethyl methacrylate, sulfoethyl itaconate, sulfomethyl maleate, etc.

Although the polymers can contain other functional monomers, such as N-methylolamides, e.g., N-methylolacrylamide (NMOA), it has been found that such other functional monomers are not essential to achieving acceptable physical properties in bonded or coated articles and that the detriment associated with the presence of such monomers, such as formaldehyde release upon curing, can be avoided by minimizing the concentration of such N-methylolamides, or eliminating them altogether. Thus, the preferred polymers contain less than about 1 percent, preferably less than about 0.5 percent, and most preferably no amount of N-methylolamide monomer units.

It has also been found that suitable physical properties of bonded or coated articles can be achieved without the need of cross-linking or hardening agents such as aldehyde hardeners (e.g., formaldehyde, mucochloric acid, etc.), cross-linking catalysts such as the strong base catalysts discussed by Bartman in U.S. Pat. No. 4,408,018, or acid catalysts such as phosphoric or methane sulfonic acid, complexing agents such as metals and metal compounds, or reactive monomers (e.g., glycols, polyamides, etc.). Since, to some extent, addition of such "hardening" agents increases the complexity and expense of polymer and/or textile manufacture, and since such agents are not required to achieve the desired physical properties with the polymers of this invention, the preferred polymers and finished articles are preferably substantially free of such hardening agents or their residues. Nevertheless, minor amounts of such materials can be present in the useful polymer solutions or dispersions when their presence does not detrimentally affect desirable properties of the finished article and when the beneficial effect of such materials can be justified economically.

Aqueous dispersions and solvent-containing solutions of the useful polymers can be prepared by procedures known in the art to be suitable for the preparation of olefinically unsaturated carboxylic acid ester polymers, such as acrylic ester polymers. For instance, aqueous polymer dispersions can be prepared by gradually adding each monomer simultaneously to an aqueous reaction medium at rates proportionate to the respective percentage of each monomer in the finished polymer and initiating and continuing polymerization by providing in the aqueous reaction medium a suitable polymerization catalyst. Illustrative of such catalysts are free radical initiators and redox systems such as hydrogen peroxide, potassium or ammonium peroxydisulfate, dibenzoyl peroxide, lauryl peroxide, di-tertiarybutyl peroxide, bisazodiisobutyronitrile, either alone or together with one or more reducing components such as sodium bisulfite, sodium metabisulfite, glucose, ascorbic acid, erythorbic acid, etc. The reaction is continued with agitation at a temperature sufficient to maintain an adequate reaction rate until all added monomers are consumed. Monomer addition is usually continued until the latex (dispersion) reaches a polymer concentration of about 10 to about 60 weight percent.

Physical stability of the dispersion is achieved by providing in the aqueous reaction medium, one or more surfactants (emulsifiers) such as non-ionic, anionic, and/or amphoteric surfactants. Illustrative of non-ionic surfactants are alkylpolyglycol ethers such as ethoxylation products of lauryl, oleyl, and stearyl alcohols or mixtures of such alcohols such as coconut fatty alcohol; alkylphenol polyglycol ethers such as ethoxylation products of octyl- or nonylphenol, diisopropyl-phenol, triisopropyl-phenol, di- or tritertiarybutylphenol, etc. Illustrative of anionic surfactants are alkali metal or ammonium salts of alkyl, aryl, or alkylaryl sulfonates, sulfates, phosphates, phosphonates, etc. Illustrative examples include sodium lauryl sulfate, sodium octylphenol glycolether sulfate, sodium dodecylbenzene sulfonate, sodium lauryldiglycol sulfate, and ammonium tritertiarybutylphenol, penta- and octa-glycol sulfates. Numerous other examples of suitable ionic, nonionic and amphoteric surfactants are disclosed in U.S. Pat. Nos. 2,600,831, 2,271,622, 2,271,623, 2,275,727, 2,787,604, 2,816,920, and 2,739,891, the disclosures of which are incorporated herein by reference in their entireties.

Protective colloids may be added to the aqueous polymer dispersion either during or after the reaction period. Illustrative protective colloids include gum arabic, starch, alginates, and modified natural substances such as methyl-, ethyl-, hydroxyalkyl-, and carboxymethyl cellulose, and synthetic substances such as polyvinyl alcohol, polyvinyl pyrrolidone, and mixtures of two or more of such substances. Fillers and/or extenders, in addition to the described chalcogenides, such as dispersible clays and colorants, including pigments and dyes, can also be added to the aqueous dispersions either during or after polymerization.

One additional advantage of the polymers useful in this invention is that their solutions and dispersions, and particularly their dispersions in aqueous media, are of lower viscosity than are ester polymers not containing the functional monomers useful in this invention, and they have much lower viscosities than N-methylolamide-containing polymer dispersions. Thus, the latexes have viscosities of about 100 centipoise or less, often about 50 centipoise or less measured at 21° C. at polymer concentration of 40 weight percent or more and even of 50 weight percent and more. Polymer concentrations of about 40 to about 70 percent encompass most latexes resulting from emulsion polymerization, while preferred latexes typically have solids contents of about 40 to about 60 weight percent polymer solids. The observed low viscosity behavior of the concentrated latexes is atypical, particularly for polymers having comparable molecular weights and for latexes of comparable particle size. These polymers usually have number average molecular weights of at least about 40,000 and most often at least about 50,000. Typically, polymer molecular weight maximums are about 150,000 or less, generally about 100,000 or less. The dispersed polymer particles in the latex can be of any size suitable for the intended use although particle sizes of at least about 120 nanometers are presently preferred since latex viscosity increases as particle size is reduced substantially below that level. Most often, the described latexes will have polymer particle sizes within the range of about 120 to about 300 nanometers as determined on the N-4 "Nanosizer" available from Coulter Electronics, Inc., of Hialeah, Flor. Accordingly, the polymer content of both the aqueous dispersions and solutions can be increased or the loading of the dispersions and solutions with fillers such as clays, pigments, and other extenders can be increased without exceeding permissible viscosity limits. For instance, aqueous dispersions and polymer solutions can contain more than 2 percent, often more than 5 percent, and even more than 10 percent fillers, colorants and/or extenders, in addition to the described chalcogenides.

Solutions of the useful polymers can be prepared by polymerizing the selected monomers as described above in solvents in which both the monomers and the polymers are soluble. Suitable solvents include aromatic solvents such as xylene and toluene and alcohols such as butanol. Polymerization initiators and reducing components, when employed, should be soluble in the selected solvent or mixture of solvents. Illustrative polymerization initiators soluble in the noted organic solvents include dibenzoyl peroxide, lauryl peroxide, and bisazodiisobutyronitrile. Erythorbic and ascorbic acids are illustrative of reducing components soluble in polar organic solvents.

The extended polymer compositions comprise one or more of the above-described polymers, polymer solutions or latexes in combination with a chalcogenide of the formula

$$R_9-\overset{\overset{A}{\|}}{C}-R_{10} \qquad (2)$$

wherein A is a chalcogen, $R_9$ and $R_{10}$ are independently chosen from hydrogen, $NR_{11}R_{12}$, $NR_{13}$, or monovalent organic radicals, with at least one of $R_9$ and $R_{10}$ being $NR_{11}R_{12}$ or $NR_{13}$, $R_{11}$ and $R_{12}$ are independently chosen from hydrogen and monovalent organic radicals, and $R_{13}$ is a divalent organic radical. Either or both of $R_{11}$ and $R_{12}$, and one of $R_9$ and $R_{10}$, can be any monovalent organic radical, typically having 1 to about 10, preferably 1 to about 5 atoms other than hydrogen, including, for example, alkyl, aryl, alkenyl, alkenylaryl, aralkyl, aralkenyl, cycloakyl, cycloalkenyl, or akynyl, which can be unsubstituted or substituted with pendant functional groups such as hydroxyl, carboxyl, oxide, thio, thiol, or others, and they can contain acyclic or cyclic heteroatoms such as oxygen, sulfur, nitrogen, phosphorus, or others. $R_{13}$ can be any divalent organic radical such as alkdyl, ardyl, alkenydyl, alkyndyl, aralkdyl, aralkendyl, which may contain pendant atoms or substituents and/or acyclic or cyclic heteroatoms as described for $R_{11}$ and $R_{12}$. Preferably, both $R_9$ and $R_{10}$ are $NR_{11}R_{12}$ or $NR_{13}$, both $R_{11}$ and $R_{12}$ are selected from hydrogen and organic radicals which contain about 10 atoms other than hydrogen or less, $R_{13}$ is a divalent organic radical having 10 atoms or less other than hydrogen, and Y is preferably oxygen or sulfur. Most preferably, $R_9$ and $R_{10}$ are hydrogen or $NR_{11}R_{12}$, where $R_{11}$ and $R_{12}$ are independently selected from saturated organic radicals having 10 atoms or less other than hydrogen which can contain pendant substituents and heteroatoms as described above. When the described polymer-chalcogenide combinations are to be manufactured and/or used in aqueous media, i.e., as a polymer latex, the chalcogenides are preferably water-dispersible, and most preferably they are water soluble. Particularly preferred chalcogenides are urea, thiourea, formamide, polymers of urea and thiourea, such as biuret, triuret and the sulfur analogues thereof, mono- and dialkyl substituted ureas, thioureas, polymeric ureas and thioureas, formamides and thioformamides, with the alkyl groups having 10 carbon atoms or less, preferably 5 carbon atoms or less, and combinations of these. The chalcogens are elements of Periodic Group VI-B and include oxygen, sulfur, selenium, tellurium, and polonium. Oxygen and sulfur are presently preferred due to low cost, availability, low toxicity and chemical activity.

The described chalcogenides can be combined with the described polymers by admixing the solid chalcogenide, or a solution thereof in water or other solvent, with the polymer latex or solution, or the polymer can be formed in the presence of the chalcogenide by adding the latter to the monomer emulsion (in the case of latexes) or solution (in the case of solution polymers) before or during polymerization. Preferably, however, the chalcogenide is combined with the polymer after polymerization is complete, and addition of the chalcogenide can even be deferred until shortly before use of the composition as an adhesive. Thus, the polymer can be manufactured at one site as a latex or solution, shipped to the user's site, and there admixed with the chalcogenide as described above.

While minor amounts of chalcogenide can be employed to extend the polymer compositions, the most significant improvements in economy, without intolerable reductions in adhesive properties, are realized at chalcogenide concentrations sufficient to significantly reduce the amount of polymer required. Thus, one or more of the described chalcogenides are combined with the polymer in any proportion, usually at concentrations of at least about 5, generally at least about 10, preferably at least about 20, and most preferably, at least about 30 weight percent based on the combined weight of chalcogenide and dry polymer.

As illustrated by the examples discussed hereinafter, relatively high chalcogenide concentrations can be employed without intolerable loss of physical properties. In most cases, physical properties do not begin to diminish significantly until chalcogenide concentrations in excess of 50 weight percent, based on dry polymer, although higher concentrations can be employed when slight reductions in adhesive and/or coating properties can be tolerated. Thus, chalcogenide concentrations will usually be about 70 weight percent or less, most often about 50 weight percent or less based on dry polymer. Accordingly, chalcogenide concentrations will usually be within the range of about 5 to about 70, preferably about 10 to about 50 weight percent based on chalcogenide plus dry polymer.

Without intending to be constrained to any particular theory, it is presently believed that the described chalcogenides can be employed to significantly extend the polymer compositions without intolerable loss of binding or coating properties, since they appear to form bonds or enhance bonding between the described polymers and polar groups on the bound substrate upon curing of the polymer composition. This explanation is supported by carbon nuclear magnetic resonance analyses which show that, upon curing, the resonance line of the pendant functional group carbonyl diminishes or disappears when reacted with a chalcogen and is replaced by an amide-like structure indicating that bonding of some type occurs between the chalcogenide and carbonyl groups of the pendant functional groups described above. That mechanism may also facilitate bonding the polymer to the substrate, which is also supported by the results of the examples discussed hereinafter illustrating that the chalcogenides can be substituted for a large proportion of polymer without significant loss of binder binder or coating properties.

Textile substrates useful in the textile articles of this invention include assemblies of fibers, preferably fibers which contain polar functional groups. Significantly greater improvements in tensile strength and other physical properties are achieved by application of the useful polymers to natural or synthetic polar group-containing fibers in contrast to relatively nonpolar fibers such as untreated, nonpolar polyolefin fibers. However, such nonpolar fibers also can be employed. Furthermore, polar groups, such as carbonyl (e.g., keto) and hydroxy groups, can be introduced into polyolefins, styrene-butadiene polymers and other relatively nonpolar fibers by known oxidation techniques, and it is intended that such treated polymers can be employed in the articles and methods of this invention.

For the purposes of this invention, it is intended that the term "fibers" encompass relatively short filaments or fibers as well as longer fibers often referred to as "filaments." Illustrative polar functional groups contained in suitable fibers are hydroxy, etheral, carbonyl, carboxylic acid (including carboxylic acid salts), carboxylic acid esters (including thio esters), amides, amines etc. Essentially all natural fibers include one or more polar functional groups. Illustrative are virgin and reclaimed cellulosic fibers such as cotton, wood fiber, coconut fiber, jute, hemp, etc., and protenaceous materials such as wool and other animal fur. Illustrative synthetic fibers containing polar functional groups are polyesters, polyamides, carboxylated styrene-butadiene polymers, etc. Illustrative polyamides include nylon-6, nylon-66, nylon-610, etc.; illustrative polyesters include "Dacron," "Fortrel," and "Kodel"; illustrative acrylic fibers include "Acrilan," "Orlon," and "Creslan." Illustrative modacrylic fibers include "Verel" and "Dynel." Illustrative of other useful fibers which are also polar are synthetic carbon, silicon, and magnesium silicate (e.g., asbestos) polymer fibers and metallic fibers such as aluminum, gold, and iron fibers.

These and other fibers containing polar functional groups are widely employed for the manufacture of a vast variety of textile materials including wovens, non-wovens, knits, threads, yarns, and ropes. The physical properties of such articles, in particular tensile strength, abrasion resistance, scrub resistance, and/or shape retention, can be increased by addition of the useful polymers with little or no degradation of other desirable properties such as hand, flexibility, elongation, and physical and color stability.

The useful polymers can be applied to the selected textile material by any one of the procedures employed to apply other polymeric materials to such textiles. Thus, the textile can be immersed in the polymer solution or dispersion in a typical dip-tank operation, sprayed with the polymer solution or dispersion, or contacted with rollers or textile "printing" apparatus employed to apply polymeric dispersions and solutions to textile substrates. Polymer concentration in the applied solution or dispersion can vary considerably depending primarily upon the application apparatus and procedures employed and desired total polymer loading (polymer content of finished textile). Thus, polymer concentration can vary from as low as about 1 percent to as high as 60 percent or more, although most applications involve solutions or dispersions containing about 5 to about 60 weight percent latex solids.

Textile fiber assemblies wetted with substantial quantities of polymer solutions or latexes are typically squeezed with pad roll, knip roll, and/or doctor blade assemblies to remove excess solution or dispersion and, in some instances, to "break" and coalesce the latex and improve polymer dispersion and distribution and polymer-fiber wetting. The polymer-containing fiber assembly can then be allowed to cure at ambient temperature by evaporation of solvent or water although curing is typically accelerated by exposure of the polymer-containing fiber assembly to somewhat elevated temperatures such as 90° C. to 200° C. One particular advantage of the useful polymers is that they cure relatively fast. Thus, bond strength between the polymer and fibers, and thus, between respective fibers, develops quickly. Rapid cure rate is important in essentially all methods of applying polymers to textiles since it is generally desirable to rapidly reduce surface tackiness and increase fiber-to-fiber bond strength. This is particularly true in the manufacture of loose woven textiles, knits, and nonwovens including all varieties of paper. Most often, adequate bond strength and sufficiently low surface tackiness must be achieved in such textiles before they can be subjected to any significant stresses and/or subsequent processing. While cure rate can be increased with more severe curing conditions, i.e., using higher temperatures, such procedures require additional equipment, increased operating costs, and are often unacceptable due to adverse effects of elevated temperatures on the finished textile.

The polymer content of the finished textile can vary greatly depending on the extent of improvement in physical properties desired. For instance, very minor amounts of the useful polymers are sufficient to increase tensile strength, shape retention, abrasion resistance (wear resistance), and/or wet-scrub resistance of the textile fiber assembly. Thus, polymer concentrations of at least about 0.1 weight percent, generally at least about 0.2 weight percent, are sufficient to obtain detectable physical property improvements in many textiles. However, most applications involve polymer concentrations of at least about 1 weight percent and preferably at least about 2 weight percent based on the dry weight of the finished polymer-containing textile article. Polymer concentrations of about 1 to about 95 weight percent can be employed, while concentrations of about 1 to about 30 weight percent based on finished textile dry weight are most common.

The product property in which the most significant improvement results depends, at least to some extent, on the structure of the treated fiber assemblage. For instance, threads and ropes formed from relatively long, tightly wound or interlaced fibers and tightly woven textiles generally possess significant tensile strength in their native state, and the percentage increase in tensile strength resulting from polymer treatment will be less, on a relative basis, than it is with other products such as loose-wovens, knits, and non-wovens. More specifically, significant improvements in abrasion resistance and scrub resistance are achieved in threads, ropes, and tightly woven textiles, and significant improvement in tensile strength (both wet and dry) can be realized in such products which are manufactured from relatively short fibers and which thus have a relatively lower tensile strength in their native form. Usually the most significant improvements sought in loose-woven textiles are shape retention (including retention of the relative spacing of adjacent woven strands), abrasion resistance, and scrub resistance, and these improvements can be achieved by the methods and with the articles of this invention. Similar improvements are also obtained in knitted fabrics.

The most significant advantages of the useful methods and textile articles are in the field of non-wovens. Non-wovens depend primarily on the strength and persistence of the fiber-polymer bond for their physical properties and for the retention of such properties with use. Bonded non-woven fabrics, such as the textile articles of this invention, can be defined generally as assemblies of fibers held together in a random or oriented web or mat by a bonding agent. While many non-woven materials are manufactured from crimped fibers having lengths of about 0.5 to about 5 inches, shorter or longer fibers can be employed. The utilities for such non-wovens range from hospital sheets, gowns, masks, and bandages to roadbed underlayment supports, diapers, roofing materials, napkins, coated fabrics, papers of all varieties, tile backings (for ungrouted tile prior to installation), and various other utilities too numerous for detailed listing. Their physical properties range all the way from stiff, board-like homogeneous and composite paper products to soft drapeable textiles (e.g., drapes and clothing), and wipes. The myriad variety of non-woven products can be generally divided into categories characterized as "flat goods" and "highloft" goods, and each category includes both disposable and durable products. Presently, the major end uses of disposable flat goods non-wovens include diaper cover stock, surgical drapes, gowns, face masks, bandages, industrial work clothes, and consumer and industrial wipes and towels such as paper towels, and feminine hygiene products. Current major uses of durable flat goods non-wovens include apparel interlinings and interfacings, drapery and carpet backings, automotive components (such as components of composite landau automobile tops), carpet and rug backings, and construction materials, such as roadbed underlayments employed to retain packed aggregate, and components of composite roofing materials, insulation, pliable or flexible siding and interior wall and ceiling finishes, etc.

The so-called "highloft" non-wovens can be defined broadly as bonded, non-woven fibrous structures of varying bulks that provide varying degrees of resiliency, physical integrity, and durability depending on end use. Currently, major uses of highloft non-wovens include the manufacture of quilts, mattress pads, mattress covers, sleeping bags, furniture underlayments (padding), air filters, carpet underlayments (e.g., carpet pads), winter clothing, shoulder and bra pads, automotive, home, and industrial insulation and paddings, padding and packaging for stored and shipped materials and otherwise hard surfaces (e.g., automobile roof tops, chairs, etc.), floor care pads for cleaning, polishing, buffing, and stripping, house robes (terrycloth, etc.), crib kick pads, furniture and toss pillows, molded packages, and kitchen and industrial scrub pads.

The polymers and methods can be used to manufacture all such non-wovens, and they are particularly useful for the manufacture of non-wovens free of, or having reduced levels of, formaldehyde or other potentially toxic components and which have relatively high wet and dry tensile strength, abrasion resistance, color stability, stability to heat, light, detergent, and solvents, flexibility, elongation, shape retention, and/or acceptable "hand." They are also particularly useful in manufacturing methods which require relatively short cure time (rapid bonding rate), relatively high polymer-to-fiber cohesion, temperature stability (during curing and subsequent treatment), and/or the use of slightly acidic, neutral or alkaline application solutions or dispersions.

The extended polymer compositions can also be employed to bind two or more substrates to each other or to coat such substrates and, thus, can be employed as coatings and adhesives for forming laminates or other composite articles and for assembling adhesive-bound structures. Illustrative of such uses are binding or formation of laminates of substrates such as acrylates, terephthalates, cellulosics (e.g., wood, paper, etc.), phenolic resins, urethane, metals, and the like; adhering carpet backing to tufted or woven carpets, bonding vapor barriers (plastic films) to insulation, wall board, etc., adhering tiles or other wall or floor coverings to concrete, wallboard, wood or other structural materials, application of wood veneers to wood or composite backings, and numerous other similar adhesive applications.

When the extended polymer compositions are used as coatings for any one of a variety of substrates, such as those identified immediately above, they may also contain one or more other ingredients, if desired, so long as such ingredients do not prevent hardening, or the compositions can be employed simply as clear coatings. Illustrative, optional ingredients include colorants, such as dyes and pigments, heat and ultra-violet stabilizers for the copolymers, accelerators for hardening the polymers, plasticizers, etc. Films and coatings may then be deposited with either the emulsion or solution polymers, for example, by Weir coating, i.e. application of the polymer composition from a bath thereof having a controlled overflow, or by brush, spray or doctor- or air-knife coating, by dip coating, etc., and the products may then be cured at ambient or elevated temperatures. Polymer concentrations suitable for use in latexes and solutions employed for coatings and adhesives are similar to those described hereinabove for textile binders. However, most binding applications, other than textile binding, and coating applications, such as clear coatings and paints, will generally involve polymer concentrations of at least about 5, typically at least about 10 weight percent of the total composition. Thus, polymer concentrations useful in such applications will generally be within the range of about 5 to about 70, preferably about 10 to about 50 weight percent. The relative proportions of polymer and chalcogenide useful in such coating and binding applications are as described hereinabove.

The invention is further described by the following examples which are illustrative of specific modes of practicing the invention and are not intended as limiting the scope of the invention as defined by the appended claims.

EXAMPLE 1

A latex containing a copolymer having about 35.5 weight percent methyl acrylate, 63.5 weight percent ethyl acrylate, and 1 weight percent itaconic acid was prepared as follows:

A monomer-surfactant preemulsion was prepared by combining 131.6 g. deionized water, 6.4 g. itaconic acid, 11.2 g. polyethoxylated nonyl phenol surfactant having 50 moles ethylene oxide per mole, 11.2 g. polyethoxylated nonyl phenol surfactant having 40 moles ethylene oxide per mole, 13.6 g. polyethoxylated nonyl having 9 moles ethylene oxide per mole, 216.1 g. methyl acrylate, and 386.8 g. ethyl acrylate. The reactor was initially charged with about 300 g. deionized water and 30 ml. of the above-defined monomer-surfactant preemulsion, after which the resulting mixture was purged with nitrogen. This mixture was next heated to about 52° C., and 0.6 g. potassium peroxydisulfate and 0.6 g. sodium metabisulfite were added, with mixing. This mixture then was heated to about 61° C. to initiate polymerization. At this point, the remainder of the monomer-surfactant preemulsion, along with 35 ml. of a solution of 2.4 g. potassium peroxydisulfate in 100 ml. deionized water, and 35 ml. of a solution of 2.4 g. sodium metabisulfite in 100 ml. deionized water were gradually metered into the agitated reactor over a period of about 4 hours. During this addition, the reaction medium was kept at a constant temperature of about 61° C. and, at the completion of such addition, the latex had a polymer solids content of about 56 weight percent, a viscosity, at 21° C., of 62 centipoise, and a pH of about 5.3. Completion of the reaction was assured by post addition of about 0.12 g. potassium peroxydisulfate and about 0.2 g. sodium metabisulfite.

EXAMPLE 2

Chromatographic grade filter paper was saturated with the copolymer latex of Example 1 and oven dried at 150° C. for 3 minutes to form an impregnated paper sample containing about 23 weight percent polymer. A 1-inch by 4-inch section of this sample was tested for wet tensile strength (after dipping it in a 1% "Aerosol OT" solution, manufactured by American Cyanamid Co., for about 4 seconds) on an Instron Model 1122 tensile testing machine. A wet tensile strength of 1.8 pounds was obtained. A similar sized polymer-saturated paper sample, after being dipped for 4 seconds in neat perchlorethylene, had a "PCE" tensile strength of 3.2 pounds.

EXAMPLE 3

A polymer emulsion was prepared using the compositions and procedures of Example 1 with the exception that sufficient acetoacetoxyethyl methacrylate was added to the monomer-surfactant preemulsion to obtain a finished polymer containing about 4 weight percent of that monomer. The concentrations of the other monomers were reduced to 1 weight percent itaconic acid, 34 weight percent methyl acrylate and 61 weight percent ethyl acrylate. The resulting latex had a solids content of 54 weight percent, a pH of 5.4, and a viscosity of 24 centipoise. The wet and PCE tensile strengths, obtained as described in Example 2 with a polymer loading of 21.6 weight percent, were 5.0 and 7.4 pounds, respectively.

EXAMPLE 4

The latexes of Examples 1 and 3 were each diluted with deionized water to about 25 weight percent solids concentration along with sufficient amounts of a 25 weight percent solution of urea to prepare the following latex compositions (% urea/% polymer): 0/25, 2.5/22.5, 3.8/21.2, 5/20, 6.5/18.5, and 12.5/12.5. Using the procedure of Example 2 with an 18 percent add on, the following wet tensile strength results were obtained:

| Latex | Wet Tensile Strength (Pounds) at Urea/Polymer Percents | | | | | |
|---|---|---|---|---|---|---|
| | 0/25 | 2.5/22.5 | 3.8/21.2 | 5/20 | 6.5/18.5 | 12.5/12.5 |
| Ex. 1 | 1.1 | 0.8 | 0.7 | 0.6 | 0.45 | 0.4 |
| Ex. 3 | 5.0 | 5.1 | 5.1 | 5.0 | 4.5 | 2.2 |

These results demonstrate that the polymer of Example 3 can be extended with a chalcogenide to form an extended polymer composition in accordance with this invention with little or no loss of wet tensile strength even when the amount of chalcogenide exceeds ⅓ the weight of total polymer. And even with a 50/50 chalcogenide/polymer composition, the polymer composition of Example 3, extended with the chalcogenide, had a significantly higher wet tensile strength (2.2) than did the polymer of Example 1 (0.4).

EXAMPLE 5

The procedure of Example 2 was repeated with paper strips dipped in aqueous solutions containing 0, 2.5, 3.8, 5, 6.5, and 12.5 weight percent urea. In each case, the observed tensile strength was 0.3 pound, i.e. there was no effect.

EXAMPLE 6

The procedure of Example 2 was repeated with paper treated with the latex of Example 3, but without the addition of urea solution, with the following results:

|  | Polymer concentration, % | | | | | |
|---|---|---|---|---|---|---|
|  | 25 | 22.5 | 21.2 | 20 | 18.5 | 12.5 |
| Wet Tensile, lbs. | 5.0 | 4.3 | 3.8 | 3.4 | 2.5 | 2.1 |

Comparison of Examples 4 and 6 illustrates the effectiveness of the extended polymer compositions in contrast to compositions of comparable polymer content in the absence of chalcogenide. In Example 4, there was essentially no difference in cure sample tensile strength when 30 percent of the polymer had been replaced by chalcogenide. In contrast, Example 6 illustrates that a 30 percent reduction of polymer content, in the absence of added chalcogenide, resulted in a loss of approximately half the tensile strength of the textile binder.

EXAMPLE 7

An acrylic latex containing a copolymer having about 31.8 weight percent ethyl acrylate, 59.7 weight percent butyl acrylate, 5 weight percent acrylonitrile, 1 weight percent itaconic acid, 0.5 weight percent acrylamide, and 2.0 weight percent acetoacetoxyethyl methacrylate was prepared as follows:

A monomer-surfactant preemulsion was prepared by combining 14.37 liters deionized water, 9.3 kg. ethyl acrylate, 17.425 kg. butyl acrylate, 1.47 kg. acrylonitrile, 570 g. acetoacetoxyethyl methacrylate, 292 g. itaconic acid, 150 g. acrylamide, and 725 g. alpha-olefinic sulfonate surfactant. The reactor was initially charged with 14 liters water, heated to 65° C., and purged with nitrogen, after which the described preemulsion, a catalyst solution comprised of 86 g. sodium persulfate and 21 g. sodium bicarbonate in 2.14 liters water, and an activator solution comprised of 53 g. erythorbic acid in 2.2 liters water were added over a three hour period. After the above solutions had been added, the reactor temperature was raised to 71° C. and the reaction was continued for an additional two hours, during which time small additions of a mixture of t-butyl hyperoxide and erythorbic acid were made. The resulting latex, after filtering, had a solids content of about 45 weight percent, a pH of 2.8, and a viscosity of 50 centipoise.

EXAMPLE 8

The latex of Example 7 was evaluated using the procedures of Examples 2 and 4, with a number of different extenders, and the results are summarized in the following table:

| Chalco- | Wet Tensile Strength (Pounds) at Extender/Polymer Percents | | | | |
|---|---|---|---|---|---|
| genide | 0/25 | 2.5/22.5 | 5/20 | 6.5/18.5 | 12.5/12.5 |
| Urea | 5.2 | 5.2 | 5.0 | 4.7 | 3.9 |
| Thiourea | 5.2 | 5.7 | 5.8 | 5.6 | 5.1 |
| Dimethyl-thiourea | 5.2 | 5.1 | 4.6 | 4.1 | 3.7 |
| Formamide | 5.2 | 5.2 | 5.0 | 5.0 | 4.0 |
| Methyl formamide | 5.2 | 5.7 | 6.1 | 5.4 | 5.0 |
| Dimethyl formamide | 5.2 | 5.3 | 5.6 | 5.3 | 5.2 |

These results demonstrate that significant amounts, i.e., up to 50 percent and more, of a variety of chalcogenide extenders can be used as substitutes for polymer content in the latex without unacceptable loss of physical properties.

EXAMPLE 9

The latex of Example 7 was evaluated using the procedure of Example 8 with neat perchloroethylene being used in place of an aqueous surfactant solution. The results are summarized in the following table:

| Chalco- | Perchloroethylene Tensile Strength (Pounds) At Extender/Polymer Percents | | | | |
|---|---|---|---|---|---|
| genide | 0/25 | 2.5/22.5 | 5/20 | 6.5/18.5 | 12.5/12.5 |
| Urea | 6.4 | 5.3 | 4.4 | 3.5 | 2.0 |
| Thiourea | 6.4 | 6.0 | 6.0 | 6.1 | 4.2 |
| Methyl formamide | 6.4 | 6.2 | 6.0 | 5.9 | 5.9 |
| Dimethyl formamide | 6.4 | 6.2 | 6.3 | 6.3 | 6.2 |

These results demonstrate that the cohesive and adhesive strengths of the polymer can be maintained even when significant amounts of chalcogenide extenders are substituted for corresponding amounts of polymer even after treatment with perchloroethylene.

EXAMPLE 10

The latex described in Example 8 containing 5 weight parts dimethylthiourea and 20 weight parts of the polymer can be applied by spraying onto one surface of a Mylar film and allowed to dry (cure) to create a clear coating on the Mylar film.

EXAMPLE 11

An extended polymer latex containing 13 weight parts methylformamide and 37 weight parts of the polymer described in Example 7 can be prepared as described in Example 8 to produce a composition having a total solids content of 50 weight percent. That composition can be applied to one surface of a 1/16-inch thick wood veneer, by brushing the latex onto the veneer surface, and the coated veneer can be adhered to wallboard before the latex-coated surface is dried.

EXAMPLE 12

A pigmented, paint composition can be prepared by using, as a starting latex, the dimethylformamide-containing latex prepared as described in Examples 7 and 8 by using undiluted dimethyl formamide and latex solutions to prepare a composition containing 10 weight parts dimethylformamide, 40 weight parts polymer, and added pigment by the procedures described in U.S. Pat. No. 4,421,889, the disclosure of which is incorporated herein its entirety. The resultant composition can be employed to apply a pigmented coating to prepared wooden surfaces.

While particular embodiments of the invention have been described, it will be understood, of course, that the invention is not limited to these embodiments, since many obvious modifications can be made, and it is intended to include within this invention any such modifications as will fall within the scope of the appended claims.

What is claimed is:

1. A fiber assembly bonded with a binder comprising a composition comprising (A) a polymer having pendant functional groups attached to the polymer backbone having the formula:

$$-R_1-\overset{O}{\underset{\|}{C}}-CH_2-X$$

and (B) a chalcogenide of the formula:

$$R_9-\overset{A}{\underset{\|}{C}}-R_{10}$$

wherein $R_1$ is a divalent organic radical at least three atoms in length, X is —CO—$R_4$ or —CN, $R_4$ is hydrogen or a monovalent organic radical, A is a chalcogen, each of $R_9$ and $R_{10}$ is independently selected from the group consisting of hydrogen, $NR_{11}$, $R_{12}$, $NR_{13}$, and monovalent organic radicals, at least one of $R_9$ and $R_{10}$ being $NR_{11}R_{12}$ or $NR_{13}$, each of $R_{11}$ and $R_{12}$ is independently selected from hydrogen and monovalent organic radicals, and $R_{13}$ is a divalent organic radical wherein the fibers are selected from the group of short filament fibers, long filament fibers or a combination thereof and wherein the fiber assembly forms a textile material.

2. The composition defined in claim 1 wherein said polymer is selected from
   (1) conjugated diolefin polymers containing at least 30 weight percent of one or more conjugated diene monomers having 4 to 8 carbon atoms and 0 to about monomers 70 weight percent of one or more
   (2) olefin-ester interpolymers containing at least about 1 weight percent of a monoolefin monomer having up to 4 carbon atoms and at least 40 weight percent of an alkenyl or alkenol ester of a percent of an alkenyl or alkenol ester of a saturated carboxylic acid,
   (3) olefinically unsaturated carboxylic acid ester polymers containing polymerized, olefinically unsaturated monomers of which at least 40 weight percent are polymerized olefinically unsaturated carboxylic acid ester monomers,
   (4) polymers of olefinically unsaturated monomers containing at least 30 weight percent alkenyl ether monomer units.
   (5) polymers of vinylidene chloride or vinyl chloride with or without other polymerized, olefinically unsaturated monomers, and
   (6) combinations thereof, and said composition comprises at least about 5 weight percent of said chalcogenide based on the weight of chalcogenide plus dry polymer.

3. The composition defined in claim 2 further comprising a member selected from the group consisting of polymerized acrylic acid, itaconic acid, acrylamide, acrylonitrile, hydroxyethylacrylate, and combinations thereof.

4. The composition defined in claim 2 wherein said polymer comprises one or more of said olefinically unsaturated carboxylic acid ester polymers.

5. The composition defined in claim 1 wherein A is selected from oxygen and sulfur, $R_1$ is a divalent organic radical having up to about 40 carbon atoms, $R_4$ is hydrogen or a monovalent organic radical having up to about 10 carbon atoms, $R_9$, $R_{10}$, $R_{11}$ and $R_{12}$ are hydrogen or monovalent organic radicals having up to about 10 atoms other than hydrogen and $R_{13}$ is a divalent organic radical having up to about 10 atoms other than hydrogen, $R_1$, $R_4$, $R_9$, $R_{10}$, $R_{11}$, $R_{12}$ and $R_{13}$, when the are organic radicals, comprise organic radicals containing hydrogen and carbon with or without heteroatoms selected from the group consisting of oxygen, phosphorus, sulfur nitrogen, and combinations thereof, and which can be substituted or unsubstituted with substituents selected from the group consisting the hydroxy, halo, thio, and amino substituents, and combinations thereof.

6. The composition defined in claim 1 wherein $R_1$, is a divalent organic radical having up to about 40 carbon atoms, $R_4$ is hydrogen or alkyl having up to about 10 carbon atoms, $R_9$, $R_{10}$, $R_{11}$ and $R_{12}$ are independently selected from hydrogen or alkyl radicals having up to about 5 carbon atoms $R_{13}$ is a divalent hydrocarbyl radical having up to about 10 carbon atoms, and A is oxygen or sulfur.

7. The composition defined in claim 6 wherein $R_1$ has the formula $$-\overset{O}{\underset{\|}{C}}-Y-R_3-Z-$$

wherein Y and Z are independently selected from oxygen and sulfur, and $R_3$ is selected from substituted and unsubstituted alkylene, alkylene-oxy, alkyleneimine and alkylene-thio radicals.

8. The composition defined in claim 1 wherein said polymer comprises about 0.1 to about 30 weight percent of said functional monomer.

9. The composition defined in claim 1 wherein said composition is free of polyvalent metals, compounds and complexes.

10. The composition defined in claim 1 wherein said polymer is free of crosslinking agents.

11. The composition defined in claim 1 wherein X is —CO—$R_4$, and $R_4$ is selected from hydrogen and hydrocarbyl radicals having up to about 10 carbon atoms.

12. The composition defined in claim 1 wherein X is —CO—$R_4$, $R_1$ is selected from cyclic and acyclic divalent organic radicals 3 to about 40 atoms in length, $R_4$ is selected from hydrogen and monovalent organic radicals having up to 10 atoms other than hydrogen. A is selected from oxygen and sulfur, $R_9$ and $R_{10}$ are independently selected from hydrogen and $NR_{11} R_{12}$, and $R_{11}$ and $R_{12}$ are selected from hydrogen and hydrocarbyl radicals having up to 10 atoms other than hydrogen.

13. The composition defined in claim 1 wherein A is selected from oxygen and sulfur, $R_9$ and $R_{10}$ are independently selected from hydrogen and $NR_{11} R_{12}$, and $R_{11}$ and $R_{12}$ are selected from hydrogen and hydrocarbyl radicals having up to carbon 10 atoms.

14. The composition defined in claim 1 wherein said polymer comprises at least about 0.1 weight percent of a polymerized functional monomer having the formula:

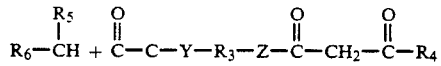

wherein $R_4$, $R_5$ and $R_6$ are independently selected from hydrogen and monovalent organic radicals, Y and Z are independently selected from oxygen, sulfur and $NR_7$, $R_7$ is hydrogen or a monovalent hydrocarbyl radical having up to about 6 carbon atoms, and $R_3$ is a divalent hydrocarbyl radical up to 40 atoms in length, which may contain heteroatoms selected from oxygen, phosphorus, sulfur and nitrogen.

15. The composition defined in claim 14 wherein $R_4$, $R_5$, and $R_6$ are selected from hydrogen and, hydroxy, halo, thiol and amino-unsubstituted monovalent hydrocarbyl radicals having up to 10 carbon atoms, $R_7$ is selected from hydrogen and monovalent hydrocarbyl radicals having up to 10 atoms other than hydrogen, and Y and Z are independently selected from oxygen and sulfur.

16. The composition defined in claim 1 wherein said polymer is selected from said olefinically unsaturated carboxylic acid ester polymers and comprises at least about 0.1 weight percent of a polymerized function al monomer selected from the group consisting of acetoacetoxyethyl-methacrylate and acetoacetoxyethylacrylate, and combinations thereof.

17. The composition defined in claim 1 wherein $R_1$ has the formula:

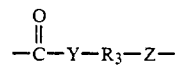

wherein Y and Z are independently selected from oxygen, sulfur and $NR_7$, $R_3$ is a divalent organic radical up to about 40 atoms in length, and $R_7$ is H or hydrocarbyl having up to about 6 carbon atoms.

18. The composition defined in claim 17 wherein $R_3$ is selected from substituted and unsubstituted alkylene, alkyeleneoxy, alkyleneimine and alkylene-thio radicals, Y and Z are oxygen, X is $-CO-R_4$, and $R_4$ is selected from hydrogen and hydrocarbyl having up to about 10 carbon atoms.

19. The composition defined in claim 1 wherein said polymer comprises a polymerized, olefinically unsaturated carboxylic acid monomer having up to about 10 carbon atoms.

20. The composition defined in claim 1 comprising a water-base latex of polymer particles of said polymer dispersed in a continuous aqueous medium, wherein said chalcogenide is water-soluble.

21. The composition defined in claim 1 wherein said chalcogenide is selected from the group consisting of urea, thiourea, biuret, triuret, alkyl-substituted and unsubstituted formamide and thioformamide, and combinations thereof.

22. The composition defined in claim 20 wherein said chalcogenide is selected from the group consisting of the urea, thiourea, biuret, triuret, alkyl substituted and unsubstituted formamide and thioformamide, and combinations thereof.

23. The composition defined in claim 16 comprising a water-base latex of polymer particles of said polymer dispersed in a continuous aqueous medium, wherein said chalcogenide is water-soluble and is selected from the group consisting of urea, thiourea, biuret, triuret, alkyl substituted and unsubstituted formamide and thioformamide, and combinations thereof.

* * * * *